US006534104B1

(12) United States Patent
DeRouchey et al.

(10) Patent No.: US 6,534,104 B1
(45) Date of Patent: Mar. 18, 2003

(54) USE OF MODIFIED INGREDIENTS AND FEED TO IMPROVE PERFORMANCE AND/OR UTILIZATION OF ANIMALS

(75) Inventors: Joel M. DeRouchey, Manhattan, KS (US); Mike D. Tokach, Abilene, KS (US); Jim L. Nelssen, Manhattan, KS (US); Robert D. Goodband, Manhattan, KS (US); Steve S. Dritz, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 0 days.

(21) Appl. No.: 09/675,465

(22) Filed: Sep. 28, 2000

(51) Int. Cl.[7] .............................................. A23B 5/015
(52) U.S. Cl. ....................... 426/240; 426/641; 426/644; 426/646; 426/647; 426/657; 426/805; 426/807
(58) Field of Search ................................. 426/240, 641, 426/644, 647, 646, 657, 805, 807

(56) References Cited

U.S. PATENT DOCUMENTS

| | | | | |
|---|---|---|---|---|
| 3,936,393 A | * | 2/1976 | Jurd et al. | 252/404 |
| 4,151,419 A | * | 4/1979 | Morris et al. | 250/453 |
| 4,330,463 A | * | 5/1982 | Luijerink | 260/112 B |
| 5,064,665 A | * | 11/1991 | Klopfenstein et al. | 426/2 |
| 5,575,999 A | * | 11/1996 | Yoder | 424/94.6 |
| 6,004,576 A | * | 12/1999 | Weaver et al. | 424/442 |
| 6,117,458 A | * | 9/2000 | Morgan | 426/2 |
| 6,162,477 A | * | 12/2000 | Crisinel et al. | 426/256 |

FOREIGN PATENT DOCUMENTS

DE          85701051       * 10/1983

OTHER PUBLICATIONS

Borsa et al., Proc. Annu. Conf.—Can. Nucl. Soc. vol. 12, p. 65–70, 1991.*
Srivivas et al. Indian J. Mycol. Pl. Pathol., vol. 20(3) pp. 308–309, 1996.*
Sciriski et al. Report (1975), SAND–75–5640, 23pp. INIS Atonindex 1976 vol. 7(7), Abstr. #23371, 1975.*
El–Fonly et al., Isotope & Radiation Res., vol. 21(2), pp. 135–145, 1989.*
Neijssen et al., Nucl. Eur. vol. 9 (7–8), p. 49, 1989.*
Dvorak et al., Veterinarni Medicine, vol. 30 (10) p. 629–636, Oct. 1985.*
Rao et al., "Nutritional and chemical toxicity" Published by Wiley, Chichester, p. 345–374, 1998.*
Federal Register, vol. 60 (188), 50114–15, 1995.*
"The Relative Nutritive Value of Irradiated Spray–Dried Blood Powder and Heat–Sterilized Blood Meal as Measured in Combination with Whey Protein," by T.E.H. Downes, et al., published in *S.Afr.J.Anim.Sci.* 1987, 17(2), pp. 55–58.
Opinion of the Scientific Committee on Food on the Irradiation of Eight Foodstuffs (expressed on Sep. 17, 1998), pp. 1–9.

"Feeding Experiments with Pigs," by Maire Jaarma, published in *Nutr. Dieta* 8: 109–129 (1966).
"Irradiation of Poultry Feed I. Microbial Status and Bird Response," by S. Leeson, et al., published in *World's Poultry Science Journal*, vol. 49, Mar. 1993, pp. 20–33.
"Radiation Treatment of Meat Products and Animal By–Products," by P.–I.E. Hansen of the Danish Meat Research Institute, Roskilde, Denmark, published in Vienna, 1966.
Effect of Radiation Treatment on Protein Quality and Vitamin Content of Animal Feeds, by B.O. Eggum, published in *Decontamination of Animal Feeds by Irradiation*, by the Joint FAO/IAEA Division of Atomic Energy in Food and Agriculture, proceedings of an advisory group meeting, Sofia, Oct. 17–21, 1977.
"Effect of Gamma Radiation on Growth and Aflatoxins Production by *Aspergillus flavus*," by M. Srinivas, et al.; published in *Indian J. Mycol. Pl. Parhol.*, vol. 26, No. 3, 1996, pp. 308–309.
"Controlling the Aflatoxin Producing Fungi Contaminating Animal Feed by Gamma Irradiation," by M.Z. El–Fouly, et al.; published in *Isotope and Radiation Research* (1989) vol. 21, No. 2, pp. 135–145.
"Irradiation Effect on Animal Feeds and Feedstuffs," by T. Kume; published by *Japan Atomic Energy Research Inst.*, Tokyo, p. 103, (1983).
"The Effect of Ionizing Radiation on Structural Changes in the Energy Nutrients in Animal Feed," J. Dvorak, et al.; *Veterinami Medicina* (1985) 30 (10) 629–36.
"Animal Diets in Safety Evaluation Studies," by G.N. Rao, et al., *Nutrition and Chemical Toxicity*, published by Wiley, Chichester, 1998 345–374.
"Food Additives; Irradiation in the Production, Processing, and Handling of Animal Feed and Pet Food; Ionizing Radiation for Treatment of Poultry Feed or Poultry Feed Ingredients," by United States Food and Drug Administration, *Fed. Regist.* (1995) 60(188), 50114–15.
"Chemical and Biological Evaluation of the Nutritive Value of Heat–Sterilized and Radappertized Feed Mixtures," by J.G. Van Kooij, published in *Decontamination of Animal Feeds by Irradiation*, by the joint FAO/IAEA Division of Atomic Energy in Food and Agriculture, proceedings of an advisory group meeting, Sofia, Oct. 17–21, 1977.
"Practical Application of Gamma Irradiation," by Peter J.G. Neijssen; *Nucl. Eur.* (1989), 9(7–8).

* cited by examiner

*Primary Examiner*—Chhaya D. Sayala
(74) *Attorney, Agent, or Firm*—Armstrong Teasdale LLP

(57) ABSTRACT

A method for preparing modified ingredients and feed to improve performance and/or feed utilization of animals.

An animal feed and method for preparing an animal feed. An enhanced method for preparing an animal feed and an enhanced animal feed. This invention also relates to the use of irradiation technology of a feed component for one animal whereby an enhancement is provided, including but not limited to, feed gain performance and the like.

21 Claims, No Drawings

USE OF MODIFIED INGREDIENTS AND FEED TO IMPROVE PERFORMANCE AND/OR UTILIZATION OF ANIMALS

FIELD OF THE INVENTION

This invention relates to an animal feed and to a method for preparing an animal feed. More particularly, this invention relates to an enhanced method for preparing an animal feed and to an enhanced animal feed. More particularly still, this invention relates to the use of irradiation technology to at least one feed component for a feed provided to an animal whereby an enhancement is provided, to the animal, including but not limited to, feed gain performance of the animal and pathogen reduction in diet content.

BACKGROUND OF THE INVENTION

Feedlots (including operations where a pig or hog is fed) house numerous animals being fed under a management system to optimize animal quality and satisfactory return on investment for the feedlot operator. The size of the animals range from small to large. The objective is to feed the animals and then market them.

Such animals generally have been bought in many locations and come from diverse situations and are put together for the purpose of having the animals attain weight gain. The animals can be properly observed in the feedlot and cared for as necessary. The animals are kept in small groups in lots or pens. Each of the pens has suitable feeding and watering means for the animals. A pen can have one or many animals in it.

Proper care in the feedlot is managed so the animals are properly cared for, including properly attending to their food needs, water, nutrition and any veterinarian medical needs.

A feedlot operator, such as a swine producer who feeds pigs and hogs, wants to make sure that the pigs are well cared for, are attended to and since the feedlot is a business, the swine producer is concerned with high weight gain of the pigs and their good nutrition. Especially important to the swine producer is being able to have young pigs gain very quickly especially after weaning. To the swine producer, the capability to convert expensive pig and hog feed into sustaining weight gain is a critical factor in the successful operation of a hog feeding operation. It is very important to feed young pigs a diet rich in amino acids, including lysine, and the like, so that the young pig has a very enhanced growth period.

Young pigs are generally fed as many as four or six (probably sequential staged) diets or more. The composition of these customized diets produced by the feedlot operator are a function of the age of the pig and progress of the pig on the diet among other factors. The feedlot operators utilizes such staged diets to enhance weight gain objective.

Operating costs are important to a feedlot operator. These costs include the overhead costs of operating a feedlot and veterinarian bills, vaccinations, feedlot building maintenance and overhead, heating, cooling, supplying water and the like. The amount of time that an animal spends in the feedlot should be minimized so that the operator's costs per pound gain are minimized. Since pigs are cycled through such an operation, achieving low cost per cycle is highly desired.

Nutrient requirements different from animal to animal and the same holds true with respect to pig to pig. Also the amount of feed required per pig differs because the pigs differ somewhat in weight, genetics, and the like. However an overall benefit is brought to the various cycles of pigs by this invention wherein the benefits are most noticed.

OBJECTS OF THE INVENTION

It is an object of the present invention to provide an enhanced method of producing an animal feed.

It is a further object of the invention to provide a method of enhancing the feeding of an animal.

It is a still further object of the invention to provide a method of enhancing the weight gain of an animal.

It is yet an additional object of the invention to provide a method of optimizing feed gain efficiency of an animal.

It is another object of the invention to provide an enhanced animal feed composition such as an irradiated feed.

It is yet an additional object to provide a higher average daily feed intake by feeding of a diet in accordance with this invention.

It is also an object of this invention to provide a method of optimizing feed lot (and pig feeding) operations.

The above and yet other objects are met in this invention which is described in more non-limiting detail hereinafter.

SUMMARY OF THE INVENTION

This invention comprises a method for preparing a nutritionally adequate diet for an animal, the diet having a reduced pathogen content and the diet containing an effective amount of at least one irradiated component selected from a grain and grain by-product, a fat source, a protein source or a lactose source, mixtures thereof and the like, which comprises providing a non or partially irradiated component to a suitable irradiation application means and applying an effective amount of radiation to the component (s) whereby an irradiated reduced pathogen component is produced and including the irradiated component in a diet fed to an animal.

In another embodiment, this invention comprises a method of enhancing the feeding of an animal which comprises feeding said animal and having said animal consume, as by eating, a nutritionally adequate diet, said diet comprising an effective amount of at least one irradiated component, said irradiated component selected from a grain and grain by-product, a fat source, a protein source or a lactose source, mixtures thereof and the like.

In yet another embodiment, this invention comprises a method of enhancing weight gain in an animal by feeding said animal an effective amount of a nutritionally adequate diet, said diet containing an effective amount of at least one irradiated component selected from a grain and grain by-product, a fat source, a protein source or a lactose source, mixtures thereof and the like.

In a still further embodiment, this invention comprises a method of optimizing feed gain efficiency in an animal which comprises feeding said animal an effective amount of a nutritionally adequate diet, wherein said diet comprises at least one irradiated component selected from a grain and grain by-product, a fat source, a protein source and a lactose source, mixtures thereof and the like and wherein the amount of said irradiated component is selected to optimize the feed gain of said animal.

In another embodiment, this invention comprises a method for optimizing feed lot production of animals, which comprises supplying to an animal a nutritionally adequate diet of reduced pathogen content, the diet containing an effective nutritional and volume amount of at least one irradiated component selected from a grain and grain by-product, a fat source, a protein source or a lactose source, mixtures thereof and the like and wherein the amount of the diet is optimized to the weight gain of the animals.

The invention is described in more non-limiting detail hereinafter.

DETAILED DESCRIPTION OF THE INVENTION

It is now achievable to provide a feed to an animal utilizing this invention which provides the animal with a reduced pathogen content nutritionally balanced diet so that the animal is well cared for and has an enhanced diet which this invention provides, especially in view of the present day desire to provide animals with the optimized energy and protein diet.

As used herein, the term "animal" includes but is not limited to pets, small animals, young ruminants, young pigs and the like. This invention provides enhancements for pigs with a weight in the range from about four pounds to less than about 50 pounds and preferably for pigs from about 4 lbs. to less than about 40 lbs. of weight and most preferably for pigs having a weight of about 4 lbs. to about 30 lbs.

As used herein the term "reduced" as applied to pathogen, means that the amount of pathogen is reduced as a result of irradiation treatment as compared to before radiation treatment.

Also as used herein throughout the term "feedlot(s)" includes any hog and pig feeding operation including any operation when a pig is fed.

The term "pathogen" is not limited and includes any pathogen including bacteria, viruses and the like.

Further as used herein, the term "young pig" includes a pig which is about 3 days old or more or weighing from about four pounds or so to about 50 pounds or so or less.

Useful nonlimiting irradiated components of a feed of this invention include grain or grain-byproducts, fat sources, protein sources, and lactose sources, mixtures thereof and the like.

For grain and grain by-products, ingredients would preferably include corn, wheat, sorghum, barley, oats, wheat middlings, corn gluten meal, wheat gluten meal, bakery by-products, field peas, flax, and rye. More preferred are corn, wheat, sorghum and barley, mixtures thereof and the like.

Useful nonlimiting fat sources for this invention include beef tallow, choice white grease, lard, poultry fat, restaurant grease, canola oil, coconut oil, corn oil, cottonseed oil, soybean oil, sunflower oil and the like. Preferred fats include soybean oil, beef tallow, choice white grease, poultry fat and restaurant grease mixtures thereof and the like.

Nonlimiting protein sources useful herein include animal protein and plant protein. Preferred animal proteins include animal plasma, blood cells, blood meal, meat and bone meal, fish meal, and feather meal. Preferred plant proteins include soybean meal, extruded soybeans, canola meal, and cottonseed meal, mixtures thereof and the like.

Useful nonlimiting lactose sources include crystalline lactose, spray-dried whey, roller dried whey, acid whey, sweet whey, and whey protein concentrate, mixtures thereof and the like.

In carrying out the process of this invention, the desired non irradiated or low irradiated component for a feed is typically spray dried and then irradiated in a suitable irradiation manner using a suitable (ionizing) irradiation means and apparatus and the irradiated component is then employed in a diet which is fed as food to an animal after ready this specification. Those of skill in the art will recognize that the particular apparatus and manner of providing the suitable radiation is not critical but that any suitable apparatus and means may be employed.

Typically, the component(s) to be irradiated in this invention is spray dried prior to irradiation. This is accomplished in a convenient useful spray drier apparatus which will be apparent to those of skill in the art after reading this specification.

Useful non-limiting forms of irradiation in this invention include Gamma Ray (Cobalt 60), Electron Beam, X-Ray and the like. Gamma ray and electron beam are by far the most practical and commercially available to use. As far as levels of dosage are concerned, about 0.1 to about 300 kGy may be employed, and about 0.3 to 40 kGy is preferred. Ionizing radiation is employed.

Ionizing radiation is that radiation with enough energy so that during an interaction with an atom, it can remove tightly bound electrons from their orbits, causing the atom to become charged or ionized. Nonlimiting examples are gamma rays and neutrons.

If desired, the radiation dosage level can be conveniently altered by varying the time in the irradiation chamber, conveyer speed, and will depend on strength of the source emitting the irradiation. Any suitable effective irradiation chamber may be employed if desired.

Radiation processing, in the context of this application, is considered to mean the exposing of the low or nonirradiated component to an effective amount of ionizing radiation (i.e. gamma radiation generated by an isotopic source such as Cobalt 60, or electron beams, or the photons generated from electron beam machines) in a controlled manner to ensure that a pre-determined effective dose is delivered to the target (feed) component.

Gamma radiation delivers a specified dose relatively slowly, (over a period of minutes to hours), to a large volume of product. An electron beam machine can deliver the same dose in a fraction of a second to a very small volume of product.

In accordance with this invention, the amount of irradiated food component typically employed in a diet to an animal is in the range from about 0.1 to about 100 percent and preferably from about 0.5 to about 40 percent by weight although more or less can be used if desired.

Regarding young pigs, the amount of irradiated food component typically employed in a diet of this invention is in the range from about 0.1 to about 100 percent weight and preferably from about 0.5 to about 40 percent by weight although more or less can be used if desired.

In practicing this criteria, an animal such as a young pig, is feed a diet illustrative of this invention. The animal so fed ingests the feed internally and the feed ingredients (nutrients, animal acids, etc.) are thus made available to the animal by virtue of passing through the animal and its digestive system.

The form of the diet herein and feed is not limited but can be pellets, liquid, dry, liquid, if desired. Preferably, the form is a form which the animal can effectively consume by eating such as spray dried irradiated feed.

In carrying out this invention in a feedlot (hog and pig feeding) operation, typically the irradiated component will be premixed with other component of the desired whole diet and the desired feed fed to the animal(s). If desired the components may be pre-mixed off site from the feed lot, at the feed lot or fed to the animals in a suitable feeding system and apparatus. This invention is useful for one or more animals whether in a feedlot operation or pig feeding type operation or not.

Further in carrying out this operation, the diet to the animals may be further enhanced with one or more vitamins, pharmaceuticals, protein, medicinal and energy components if and as desired.

Feed which is particularly desired is that feed which provides high protein and energy values and which provides digestible energy and metabolizable energy to an animal.

During the feeding some operators feed the pigs more nutrition than ordinarily necessary to be sure that the pig is healthy and being feed a nutritious diet. So it is of interest to maximize the feed gain so that the most weight gain results on the animal from the expensive feed fed to the animal. U.S. Pat. No. 6,117,458 which issued to Norma Morgan on Sep. 12, 2000 describes a feed for swine and some critical factors in feeding swine. That patent is incorporated herein in its entirety by reference.

If desired, one or more components of the diet of this invention can be irradiated or the entire diet can be irradiated if and as desired. Part of the diet can be fed at a time and part of the diet can be fed at a somewhat earlier or later time.

It will be recognized from this specification that the overall feed to the animal can be reduced in pathogen content and the pathogen content of the irradiated component(s) will also be reduced.

The overall feed will be a nutritionally adequate diet and the irradiated component will be a contributing component of that feed.

Further in the practice of this invention, the inventive composition may be typically prepared as by mixing and the mixed feed then delivered to the animals feeding area by any convenient means, including by hand or truck and the like. The feed is then made available to the animals as for example placing the feed in a trough or the like so that the animal has access to the feeds and eats it and it is available to the animal.

The overall and individual component(s) of a diet of this invention can be liquid, solid or mixtures thereof.

If desired, the entire diet may be irradiated in accordance with this invention.

Those of skill in the art will recognize, after reading this specification that the diet fed to animals may differ according to the particular animal being fed, the weight of the animal on feed and the amount of weight gain desired any other factors.

In practicing this invention, irradiated animal plasma is a preferred feed ingredient for pigs weighing from about 4 to about 30 pounds or more. Irradiated blood meal is preferred as a food ingredient for pigs weighing about 4 to about 30 pounds or more.

Due to the increase in consumer demand for a healthier, safer food supply, the discovery herein of the use of irradiation in one or more or all animal feed reduces potential harmful pathogens entering the animals' body (the number of such components can be from 1 to about 100 or more if desired, i.e, single or multi-component feed system). This reduction of pathogens entering into the animals body should reduce the incidence of disease in the animal and thereby increase the healthiness of the animal. This increase in the animals health would allow the animal's biological systems to focus more body function on the potential for growth, rather than using energy to destroy pathogens in the body which may later the growth status of the animal. The inventors herein have discovered that by reducing the amount of bacteria with irradiation of a single feed ingredient (spray dried blood meal or spray dried animal plasma) incorporated into a (complete) diet, the invention provided increased gain and feed intake of swine. These improvements were surprising. The performance enhancement shown in the Examples are remarkable.

The practical use of this invention is to use irradiation to either a single feed ingredient (component) or complete feeds for animals such as for swine. Starter pigs or young pigs would be the main class of swine for application of this invention. This invention has the capability to reduce the bacteria concentration in feed ingredients or complete diets without altering or substantially negatively effecting the composition of the diet or feedstuff.

This invention is surprising and unique in that it appears to not denigrate the nutritional value of irradiated feedstuffs. While not wishing to be bound by theory, the reduction in bacterial concentrations in the ingredients or complete feed of the Examples 1–4 (following) may play a significant part of the improvement in pig performance discovered in this invention.

This invention provides an integrated animal feed system whereby one or more components of the died (feed) are irradiated in whole or part.

Heretofore, methods to remove bacteria concentration involved the use of thermal treatment or inclusion of acids in the diet. However, unexpectedly this invention has shown consistent positive results in efforts to reduce the bacteria level. The efficiency of use of the feedstuff by the animal to gain weight, particularly in young pigs appears to have been maintained in this invention.

The following abbreviations are employed in Examples 1–4 following. Sources of feed components are provided. Tables are numbered within each such example.

ADG—Average Daily Gain
ADFI—Average Daily Feed Intake
F/G—Average Daily Feed Intake divided by Average Daily Gain (This is used to describe efficiency of gain)
Exp.—Experiment
BW—Body Weight
d—Day
ft—feet
lb—pounds
SEW—Segregated Early Weaning—(Describes a pig that is weaned at a young age)
kGy—KiloGrays (Describes the dosage level of irradiation treatment)
Ca—Calcium
P—Phosphorus
Na—Sodium
Cl—Chloride
GLM—General Linear Model ADDRESSES
Irradiation Facilities Used:
Exp. 1 and 3
   SteriGenics International
   1401 Morgan Circle
   Tustin, Calif. 92780-6423
   714-259-0611

Exp. 2
 Steris-Isomedix Services
 7828 Nagle Ave
 Morton Groove, Ill. 60053
 847-966-1160
Exp. 3
 Steris-Isomedix Services
 2500 Commerce Drive
 Libertyville, Ill. 60048
 847-247-0970
Exp. 4 and 5
 SteriGenics International
 711 E. Copper Court
 Schaumburg, Ill. 60173
 847- 843-0999
Sources of products that were irradiated.
Exp. 1
 Source 1 in Exp. 2
Exp. 3
Spray-dried egg in Exp. 5
 California Spray Dry Company
 P.O. Box 5035
 4221 E. Mariposa Road
 Stockton, Calif. 95205-0035
 209-948-209
Source 2 in Exp. 2
AP—920 in Exp. 5
 American Protein Corp.
 2325 N. Loop Dr.
 Ames, Iowa 50010
 515-296-9941
ProtiOne in Exp. 5
 DuCoa L.P.
 115 Executive Dr.
 P.O. Box 219
 Highland, Ill. 62249-0219
 618-654-2070
DPS 30 in Exp. 5
 Nutra-Flo Co.
 216 Cunningham Dr.
 Sioux City, Iowa 51106
 800-767-2563
Peptide Plus in Exp. 5
 Esteem Products, Inc.
 251 O'Connor Ridge Blvd.
 Ste. 300
 Irving, Tex. 972-717-5520

All references cited herein are hereby incorporated by reference for their relevant teachings. Accordingly, any reference cited herein and not specifically incorporated by reference is, nevertheless, incorporated by reference in its entirety as if part of the present specification.

The following nonlimiting Examples (1–4) illustrate specific embodiments of the invention without limiting the scope of the invention in any way.

EXAMPLES

Example 1

This Example shows the enhancing effect of irradiation of spray-dried blood meal and plasma on nursery pig growth performance.

Summary

Two trials were conducted in this Example to determine the effects of irradiation of spray-dried blood meal and animal plasma on nursery pig growth performance. In Exp. 1, irradiation of spray-dried blood meal resulted in improved ADG, F/G, and tended to increase ADFI for the 14 d experiment. The majority of the increase in growth performance occurred during the first week of the trial. In Exp. 2, ADG and ADFI were increased from d 0 to 10 when pigs consumed spray-dried plasma that was irradiated compared to pigs that consumed regular spray-dried plasma. In addition, we observed differences in growth performance between different sources of spray-dried plasma used in this experiment.

Procedures

Experiment 1. This experiment was conducted in conjunction with an experiment to determine the impact of blood meal on pig performance reported in another article. A total of 60 pigs (BW of 13.8 and 17±2 d of age) were used in a 19-d growth assay. Pigs were blocked by weight and allotted to one of two dietary treatments. There were five pigs/pen and six pens/treatment. Pigs were housed in the Kansas State University Segregated Early Wean Facility. Each pen was 4×4 ft. and contained one self-feeder and one nipple waterer to provide ad libitum access to feed and water. Initial temperature was 90 F for the first 5 d, and was lowered approximately 3 F each week thereafter.

All pigs were fed the same pelleted SEW diet (Table 1 of this Example) to 5 d post-weaning. Then, the pigs were switched to experimental diets, which included diets containing 5% spray-dried blood meal or spray-dried blood meal that had been irradiated. All blood meal used in the experiment originated from the same lot. The spray-dried blood meal was irradiated at an average dose of 9.54 kGy (24 doses with a 7.2 kGy minimum and 11.8 kGy maximum dose). Irradiation processing was completed at Sterigenics™, Tustin, Calif.

Treatment diets were fed in meal form and formulated to contain 1.40% lysine, 0.90 Ca, and 0.54 available P. Diets were also balanced for Na and Cl concentrations (Table 1). Average daily gain, ADFI, and F/G were determined by weighing pigs and measuring feed disappearance on d 5 after weaning, and on d 7 and 14 (d 12 and 19 after weaning) of the treatment period. Blood meal samples were taken for analysis to determine bacteria concentrations.

Experiment 2. A total of 180 pigs (BW of 13.1 lb and 17±2 d of age) were used in a 24 d growth assay to determine the effects of source, processing technique, and irradiation of animal plasma on nursery pig performance. There were five pigs/pen and six pens/treatment. Pigs were housed in an environmentally controlled nursery in 5×5 ft pens located at the Kansas State University Swine Teaching and Research Center. All pens contained one self-feeder and nipple water to provide ad libitum access to feed and water.

Treatment diets were fed in mash form from d 0 to 10, with a control diet containing no animal plasma and five additional diets containing 5 % animal plasma from two different sources and processing techniques. From source one, treatment diets consisted of plasma that had been spray-dried, spray-dried and irradiated, and freeze dried and irradiated. From source two, treatment diets consisted of plasma that had been spray-dried or spray-dried and irradiated. The spray-dried plasma was irradiated at an average dose of 9.75 kGy (8 doses with a 9.50 kGy minimum and 10.00 kGy maximum dose). All irradiated plasma was processed at Steris-Isomedix Services, Morton Groove, Ill. All treatment diets were formulated to contain 1.50% lysine, 0.89 Ca, and 0.54 available P. Diets were also balanced for Na and Cl concentrations (Table 1 of this Exhibit). A common Phase II diet was fed from d 10 to 24 (Table 1).

Average daily gain, ADFI, and F/G were determined by weighing pigs and measuring feed disappearance on d 5, 10, and 24 after weaning. Plasma and feed samples were taken for analysis to determine bacteria concentrations within each treatment.

Results and Discussion

Experiment 1. From d 0 to 7, pigs fed spray-dried blood meal subjected to irradiation had improved ADG ($P<0.03$), ADFI ($P<0.03$), and tended ($P<0.13$) to have improved feed efficiency (Table 2 of this Exhibit). From d 7 to 14, both ADG and F/G ($P<0.09$) improved moderately due to irradiation of blood meal, with no effect on ADFI. Overall, irradiation of blood meal improved ($P<0.02$) ADG and F/G with a tendency to increase food intake ($P<0.13$) for the entire treatment period. Irradiation of the spray-dried blood meal reduced the bacteria concentration from a $6.6 \times 10^6$ to $9.0 \times 10^1$ (Table 4 of this Example).

Experiment 2. From d 0 to 5, pigs fed animal irradiated plasma had increased ADG ($P<0.05$) and ADFI ($P<0.10$) compared to those fed regular plasma, regardless of source (Table 3 of this Example). In addition, source two nonirradiated plasma showed improved ADG and F/G ($P<0.05$) compared to the control, whereas source one did not. From d 5 to 10, source two plasma had increased ADG and ADFI ($P<0.05$) over the control diet with no animal plasma. For d 0 to 10 of the treatment period, ADG ($P<0.05$) and ADFI ($P<0.10$) was enhanced by irradiation of animal plasma verses animal plasma that was not irradiated. Freeze dried and irradiated plasma did not improve growth performance compared to plasma from the same source that had been irradiated.

From d 10 to 24, ADFI was improved ($P<0.05$) for pigs previously consuming diets containing plasma that was irradiated verses plasma that was not. In addition, pigs consuming irradiated plasma were heavier ($P<0.05$) at the conclusion of the trial compared to the control diet, whereas pigs on the treatment diets with regular spray-dried plasma were not.

Irradiation of reduced the bacteria concentration in the animal plasma, regardless of source (Table 5 of this Example). In addition, this proved to be beneficial in reducing the total bacteria load in the whole diet. However, it is evident that a large amount of bacteria exists in other feed ingredients in the nursery diets.

In this Example, irradiation of spray dried blood meal and animal plasma improved growth performance of the animals.

TABLE 1

Composition of Common and Experimental Diets (Exp. 1 & 2)

| | Common | | Exp. 1 Blood | Exp. 2 No | Added |
|---|---|---|---|---|---|
| Ingredient, % | SEW[a] | Phase II[b] | Meal | Plasma | Plasma |
| Corn | 33.37 | 48.83 | 53.62 | 41.88 | 49.39 |
| Soybean meal (46.5%) | 12.80 | 29.00 | 26.43 | 37.68 | 25.71 |
| Spray-dried whey | 25.00 | 10.00 | 10.00 | 15.00 | 15.00 |
| Lactose | 5.00 | — | — | — | — |
| Spray-dried animal plasma | 6.70 | — | — | — | 5.00 |
| Spray-dried blood meal | — | — | 5.00 | — | — |
| Spray-dried blood cells | 1.65 | 2.50 | — | — | — |
| Select menhaden fish meal | 6.00 | — | — | — | — |
| Choice white grease | 5.00 | — | — | — | — |
| Medication[c] | 1.00 | 1.00 | 1.00 | 1.00 | 1.00 |
| Monocalcium P (21% P) | .75 | 1.85 | 1.86 | 1.49 | 1.38 |
| Limestone | .45 | .95 | .79 | 1.02 | 1.15 |
| Salt | .20 | .25 | .30 | .42 | .30 |
| Calcium chloride | — | — | .18 | — | — |
| Sodium bicarbonate | — | — | — | .38 | — |
| Zinc oxide | .38 | — | .25 | .39 | .39 |
| Vitamin premix | .25 | .25 | .25 | .25 | .25 |
| Trace mineral premix | .15 | .15 | .15 | .15 | .15 |
| L-Lysine HCl | .15 | .15 | — | .15 | .15 |
| DL-Methionine | .15 | .07 | .13 | .16 | .13 |
| L-Threonine | — | — | .03 | .03 | — |
| L-Isoleucine | — | — | .01 | — | — |
| Total | 100.00 | 100.00 | 100.00 | 100.00 | 100.00 |
| Calculated Analysis | | | | | |
| Lysine, % | 1.70 | 1.40 | 1.40 | 1.50 | 1.50 |
| Met:lysine ratio, % | 30 | 28 | 33 | 34 | 30 |
| Met & Cys:lysine ratio, % | 57 | 55 | 60 | 60 | 60 |
| Threonine:lysine ratio, % | 65 | 65 | 67 | 64 | 64 |
| Tryptophan:lysine ratio, % | 18 | 20 | 21 | 20 | 19 |
| ME, kcal/lb | 1,595 | 1570 | 1449 | 1447 | 1468 |
| Calcium, % | .90 | .89 | .90 | .90 | .90 |
| Phosphorus, % | .80 | .80 | .81 | .80 | .80 |
| Available phosphorus, % | .66 | .54 | .54 | .50 | .46 |
| Sodium, % | .42 | .23 | .26 | .43 | .43 |
| Chloride, % | .45 | .39 | .43 | .53 | .53 |

[a]Diet fed from d 0 to 5 after weaning in Exp. 1.
[b]Diet fed from d 10 to 24 after weaning in Exp. 2.
[c]Provided 50 g per ton carbadox.

TABLE 2

Effects of Irradiated Spray-dried Blood Meal in Phase II Diets on Growth Performance of Nursery Pigs[a,b]

| | Blood Meal | | | Probability Regular vs |
|---|---|---|---|---|
| Item | Regular | Irradiated[c] | SE | Irradiated[d] |
| Initial weight, lb | 15.16 | 14.82 | .18 | .21 |
| d 0 to 7 | | | | |
| ADG, lb | .31 | .43 | .04 | .03 |
| ADFI, lb | .58 | .69 | .04 | .03 |
| F/G | 1.87 | 1.60 | .05 | .13 |
| d 7 to 14 | | | | |
| ADG, lb | .69 | .82 | .05 | .09 |
| ADFI, lb | .86 | .92 | .06 | .46 |
| F/G | 1.25 | 1.12 | .04 | .09 |
| d 0 to 14 | | | | |
| ADG, lb | .50 | .62 | .04 | .02 |
| ADFI, lb | .72 | .80 | .04 | .13 |

TABLE 2-continued

Effects of Irradiated Spray-dried Blood Meal in
Phase II Diets on Growth Performance of Nursery Pigs[a,b]

|  | Blood Meal | | | Probability Regular vs |
|---|---|---|---|---|
| Item | Regular | Irradiated[c] | SE | Irradiated[d] |
| ADFI, lb | 1.44 | 1.29 | .03 | .02 |
| F/G | | | | |

[a]A total of 60 pigs (five pigs per pen and six pens per treatment) with an average initial BW of 14.95 lb at the beginning of phase II. All pigs were fed a common SEW diet for the first five days. Thus, d 0 of the experiment is actually 5 d after weaning.
[b]Growth performance for the first 5 d after weaning were: ADG, .24 lb; ADFI, .23 lb; and F/G, .96.
[c]Irradiated at an average dose of 9.54 kGy (24 doses with a 7.2 kGy minimum and 11.8 kGy maximum dose).
[d]Initial pig weight (d 5 postweaning) was used as a covariate in the growth performance statistical analysis.

TABLE 4

Effect Irradiation of Spray-dried Blood
Meal on Bacteria Concentration

|  | Blood Meal | |
|---|---|---|
| Item | Regular | Irradiated |
| Total Plate Count | $6.6 \times 10^6$ | $9.0 \times 10^1$ |
| Total Coliform Count | 0 | 0 |

TABLE 3

Effects of Source, Processing Technique, and Irradiation of Plasma on Weanling Pig Growth Performance[a]

|  |  | Plasma Source 1 | | | Plasma Source 2 | | |
|---|---|---|---|---|---|---|---|
| Item | Control | Spray dried | Spray dried and irradiated | Freeze dried and irradiated | Spray dried | Spray dried and irradiated | SE |
| Initial wt, lb | 13.10 | 13.09 | 13.07 | 13.09 | 13.02 | 13.10 | |
| d 0 to 5 | | | | | | | |
| ADG[bd], lb | .49[f] | .49[f] | .62[g] | .60[g] | .59[g] | .71[h] | .03 |
| ADFI[e], lb | .46[f] | .47[f] | .52[f] | .48[f] | .47[f] | .62[g] | .04 |
| F/G[c] | .94[f] | .96[f] | .84[fg] | .80[g] | .80[g] | .87[fg] | .05 |
| D5 to 10 | | | | | | | |
| ADG[b], lb | .56[f] | .62[fg] | .69[fg] | .67[fg] | .71[g] | .75[g] | .05 |
| ADFI[b], lb | .77[f] | .82[fg] | .91[fg] | .87[fg] | .97[g] | .98[g] | .05 |
| F/G | 1.38 | 1.32 | 1.32 | 1.30 | 1.37 | 1.31 | .08 |
| d 0 to 10 | | | | | | | |
| ADG[bd], lb | .53[f] | .56[fg] | .66[hi] | .64[gh] | .65[hi] | .73[i] | .03 |
| ADFI[bc], lb | .62[f] | .65[f] | .72[fg] | .68[f] | .72[fg] | .80[g] | .04 |
| F/G | 1.17 | 1.16 | 1.09 | 1.06 | 1.11 | 1.10 | .03 |
| d 10 wt[bd], lb | 18.39[f] | 18.60[fg] | 19.62[hi] | 19.45[gh] | 19.51[hi] | 20.37[hi] | .32 |
| d 10 to 24 | | | | | | | |
| ADG, lb | .88[f] | .88[f] | .89[f] | .76[g] | .79[g] | .82[fg] | .03 |
| ADFI[d], lb | 1.08[fg] | 1.00[f] | 1.12[g] | .99[f] | .99[f] | 1.06[fg] | .03 |
| F/G | 1.23[f] | 1.14[g] | 1.26[f] | 1.30[f] | 1.25[f] | 1.29[f] | .04 |
| Final wt[be], lb | 28.11[f] | 29.71[fg] | 31.27[g] | 29.49[fg] | 29.92[fg] | 31.31[g] | .77 |

[a]A total of 180 pigs (five pigs per pen and six pens per treatment) with an average initial BW of 13.1 lb.
[b]Control vs mean of plasma trts (P < .05).
[c]Control vs mean of plasma trts (P < .10).
[d]Spray dried plasma vs spray dried and irradiated plasma (P < .05).
[e]Spray dried plasma vs spray dried and irradiated plasma (P < .10).
[fghi]Means in same row with superscripts differ (P < .05).

TABLE 5

Effect of Source, Processing Technique, and Irradiation of Animal Plasma on Bacteria Concentration

| | | Plasma Source 1 | | | Plasma Source 2 | |
|---|---|---|---|---|---|---|
| Item | No plasma control | Spray dried | Spray dried and irradiated | Freeze dried and irradiated | Spray dried | Spray dried and irradiated |
| Plasma | | | | | | |
| Total Plate Count | N/A | $9.0 \times 10^4$ | $4.5 \times 10^1$ | 0 | $2.6 \times 10^4$ | $3.5 \times 10^2$ |
| Total Coliform Count | 0 | 0 | 0 | 0 | 0 | 0 |
| Whole diet | | | | | | |
| Total Plate Count | $3.7 \times 10^4$ | $\times 10^4$ | $3.1 \times 10^3$ | $6.8 \times 10^3$ | $1.0 \times 10^4$ | $7.6 \times 10^3$ |
| Total Coliform Count | $2.8 \times 10^4$ | $6.7 \times 10^3$ | $3.0 \times 10^2$ | $2.1 \times 10^2$ | $6.0 \times 10^3$ | $1.0 \times 10^3$ |

TABLE 7

Economic Value of Source, Processing Technique, and Irradiation of Animal Plasma

| | | | Plasma Source | | | |
|---|---|---|---|---|---|---|
| Item | No plasma control | 1 Spray dried | 1 Spray dried and irradiated | 1 Freeze dried and irradiated | 2 Spray dried | 2 Spray dried and irradiated |
| Diet cost, $/ton | 198.15 | 320.06 | 330.06 | 330.06 | 320.06 | 330.06 |
| Feed cost, $/pig | .61 | 1.04 | 1.18 | 1.12 | 1.15 | 1.32 |
| Feed cost, %/lb gain | .115 | .186 | .179 | .175 | .177 | .181 |
| Wt gain in 10 d, lb | 5.30 | 5.60 | 6.60 | 6.40 | 6.50 | 7.30 |
| Value of gain at $.47/lb | 2.49 | 2.63 | 3.10 | 3.01 | 3.06 | 3.43 |
| Return over feed cost, $/pig | 1.88 | 1.59 | 1.92 | 1.89 | 1.91 | 2.11 |
| Advantage per pig, $/pig | | | +.33[a] | | | +.20[b] |

[a]Estimate that 80% of the U.S. market hogs will consume plasma during this phase of growth. This would equate to 80,000,000 pigs per year and would generate $26,400,000 due to irradiation.
[b]Estimate that 80% of the U.S. market hogs will consume plasma during this phase of growth. This would equate to 80,000,000 pigs per year and would generate $16,000,000 due to irradiation.

Example 2

This Example illustrates the enhanced effects of gamma ray and electron beam irradiation levels in spray-dried blood meal on nursery pig performance. Northeast Area Extension Office, Manhattan, Kans. Food Animal Health and Management Center.

Summary

Three hundred weaning pigs (initially 23.7 lbs and 17±6 d of age) were used in a 19-d growth assay to determine the effects of gamma ray and electron beam irradiation in spray-dried blood meal at increasing levels (2.5, 5.0, and 10.0 and 20.0 kGy) on growth performance. Irradiation of blood meal resulted in decreased concentrations of aerobic bacteria, ecoli, mold, and yeast in spray-dried blood meal. The inclusion of irradiated spray-dried blood meal tended to improve F/G from d 0 to 7 and for the overall trial (d 0 to 14), with no effects on ADG or ADFI. When comparing the two types of irradiation and dosage level, no differences in growth performance were detected. In addition, the inclusion of spray-dried blood meal did not improve growth performance over the control diet without spray-dried blood meal.

Procedures

A total of 300 pigs (BW of 23.6 and 17±6 d of age) were used in a 19-d growth assay. Pigs were blocked by weight and allotted to one of ten dietary treatments. There were five pigs/pen and ten pens/treatment. Pigs were housed in the Kansas State University Segregated Early Wean Facility. Each pen was 4×4 ft and contained one self-feeder and one nipple waters to provide ad libitum access to feed and water.

All pigs were fed the same pelleted SEW and Transition diets (Table 1) to 4 d post-weaning. All pigs were fed one lb of SEW diet, then pigs were fed the Transition diet for the remainder of the 4 d pretreatment period. At d 4, the pigs then were switched to experimental diets, which included a control diet with no added spray-dried-blood meal, a diet with 5% regular spray-dried blood meal or 5% spray-dried blood meal with irradiation treatment. Irradiation treatments included spray-dried blood meal subjected to either gamma ray (cobalt 60 source) or electron beam irradiation at increasing dosage levels (2.5, 5.0, 10.0, and 20.0 kGy). The electron beam processing was conducted at Steris-Isomedix Services, Libertyvile, Ill. The gamma processing of blood meal was accomplished at Sterigenics, Tunstin, Calif. All blood meal used in this experiment was from the same lot. Treatment diets were fed in meal form and formulated to contain 1.40%, 0.90 Ca, and 0.54 available P. Average daily gain, ADFI, and F/G were determined by weighing pigs and measuring feed disappearance on d 4, 11, and 18.

Data was analyzed as a randomized complete block design with pen as the experimental unit. Pigs were blocked based on post-weaning weight, and analysis of variance was performed using the GLM procedure of SAS. Linear, quadratic, and cubic polynomial contrasts were used to determine the effects of increasing dosage levels of irradiation. Initial pig weight at the start of the experimental period was used as a covariate for statistical analysis.

Results

Irradiation of blood meal proved effective in the reduction of aerobic bacteria, ecoli, mold, and yeast concentrations (Table 2). Blood meal subjected to gamma ray irradiation had lower concentrations of aerobic bacteria when compared to electron beam at each level of irradiation. In fact, at levels of 5.0, 10.0, and 20.0 kGy, no bacteria was detected. However, a low level of bacteria was cultured at similar dosage levels subjected to electron bean treatment.

From d 0 to 7 of the treatment period, as well as overall (d 0 to 14), the inclusion of irradiated spray-dried blood meal tended to improve F/G with no effects on ADG or ADFI (Table 3). However, for the overall experiment, ADG and F/G were increased by approximately 9 and 6%, respectively. In addition, the inclusion of spray-dried blood meal not improve growth performance over the control diet without spray-dried blood meal.

These results indicate that irradiation is an effective technology to reduce or eliminate bacteria, molds, and yeast in spray-dried blood meal. However, increasing the dosage above 2.5 kGy, regardless of source did not further enhance growth performance of nursery pigs. Also, both electron beam and gamma ray irradiation demonstrated similar results in performance.

TABLE 1

Composition of Diets (As Fed Basis)[a]

|  | Common Diets | | Treatment Diets | |
| --- | --- | --- | --- | --- |
|  |  |  | No Blood Meal | Added Blood |
| Ingredient, % | SEW | Transition | Control | Meal |
| Corn | 33.37 | 39.81 | 45.77 | 53.63 |
| Soyben meal (46.5%) | 12.80 | 23.30 | 39.45 | 26.43 |
| Spray-dried whey | 25.00 | 20.00 | 10.00 | 10.00 |
| Spray-dried animal plasma | 6.70 | 2.50 | — | — |
| Select menhaden fish meal | 6.00 | 2.50 | — | — |
| Choice white grease | 6.00 | 5.00 | — | — |
| Lactose | 5.00 | — | — | — |

TABLE 1-continued

Composition of Diets (As Fed Basis)[a]

|  | Common Diets | | Treatment Diets | |
| --- | --- | --- | --- | --- |
|  |  |  | No Blood Meal | Added Blood |
| Ingredient, % | SEW | Transition | Control | Meal |
| Spray-dried blood cells | 1.65 | 2.50 | — | — |
| Spray-dried blood meal | — | — | — | 5.00 |
| Medication[b] | 1.00 | 1.00 | 1.00 | 1.00 |
| Monocalcium phosphate (21% P) | .75 | 1.30 | 1.85 | 1.86 |
| Limestone | .45 | .73 | 82 | .79 |
| Zinc oxide | .38 | .38 | .25 | .25 |
| Vitamin premix | .25 | .25 | .25 | .25 |
| Salt | .20 | .30 | .38 | .30 |
| Trace mineral premix | .15 | .15 | .15 | .15 |
| Calcium chloride | — | — | — | .17 |
| L-Lysine HCl | .15 | .15 | — | — |
| DL-Methionine | .15 | .13 | .078 | .132 |
| L-Threonine | — | — | .004 | .033 |
| L-Isoleucine | — | — | — | .006 |
| Total | 100.00 | 100.00 | 100.00 | 100.00 |
| Calculated Analysis | | | | |
| Lysine, % | 1.70 | 1.60 | 1.40 | 1.40 |
| Met:lysine ratio, % | 30 | 30 | 31 | 33 |
| Met & Cys:lysine ratio, % | 57 | 57 | 60 | 60 |
| Threonine:lysine ratio, % | 65 | 65 | 67 | 67 |
| Tryptophan:lysine ratio, % | 18 | 19 | 21 | 21 |
| ME, kcal/lb | 1,595 | 1,559 | 1458 | 1448 |
| Protein, % | 22.4 | 22.5 | 23.7 | 22.7 |
| Calcium, % | .90 | .90 | .90 | .90 |
| Phosphorus, % | .80 | .80 | .86 | .81 |
| Available phosphorus, % | .66 | .59 | .54 | .54 |

[a]One lb per head of SEW diet was fed, then pigs were fed the Transition diet for the remainder of the 4 d pretreatment period. Pigs then were switched to treatment diets from d 4 to 18.
[b]Provided 50 g per ton carbadox.

TABLE 2

Effect of Source and Dosage Level of Irradiation on Bacteria Concentrations in Spray-dried Blood Meal.

| Item | No Blood Meal Control | Blood Meal Nonirradiatd | Blood Meal Irradiated Gamma Ray Dosage, kGy | | | | Blood Meal Irradiated Electron Beam Dosage, kGy | | | |
| --- | --- | --- | --- | --- | --- | --- | --- | --- | --- | --- |
|  |  |  | 2.5 | 5.0 | 10.0 | 20.0 | 2.5 | 5.0 | 10.0 | 20.0 |
| Blood meal | | | | | | | | | | |
| Aerobic Plate Count | N/A | $7.9 \times 10^6$ | $1.6 \times 10^4$ | 0 | 0 | 0 | $2.0 \times 10^4$ | $1.0 \times 10^3$ | $3.5 \times 10^4$ | $2.0 \times 10^4$ |
| E. coli Coliform Count | N/A | $2.3 \times 10^3$ | 0 | 0 | 0 | 0 | 0 | 0 | 0 | 0 |
| Mold and Yeast Count | N/A | $2.40 \times 10^2$ | 0 | 0 | 0 | 0 | 0 | 0 | 0 | 0 |
| Whole Diet | | | | | | | | | | |
| Total Plate Count | $1.0 \times 10^3$ | $9.2 \times 10^3$ | $6.2 \times 10^2$ | $7.8 \times 10^2$ | $1.2 \times 10^2$ | $4.3 \times 10^2$ | $5.2 \times 10^3$ | $8.2 \times 10^2$ | $9.8 \times 10^2$ | $1.3 \times 10^2$ |
| Total Coliform Count | $4.0 \times 10^1$ | $4.1 \times 10^2$ | $2.0 \times 10^1$ | $1.4 \times 10^2$ | $9.4 \times 10^1$ | 0 | $1.0 \times 10^1$ | $1.5 \times 10^1$ | $3.8 \times 10^1$ | $3.0 \times 10^1$ |

TABLE 3

Effect of Source and Level of Dietary Lysine on Growth Performance in Phase III Nursery Pigs.[a]

| Item | No Blood Meal Control | Blood Meal Nonirradiatd | Blood Meal Irradiated Gamma Ray Dosage, kGy | | | | Blood Meal Irradiated Electron Beam Dosage, kGy | | | | SE[bc] |
|---|---|---|---|---|---|---|---|---|---|---|---|
| | | | 2.5 | 5.0 | 10.0 | 20.0 | 2.5 | 5.0 | 10.0 | 20.0 | |
| Day 0 to 7 | | | | | | | | | | | |
| ADG, lb | .37 | .38 | .47 | .41 | .36 | .42 | .41 | .48 | .42 | .46 | .045 |
| ADFI, lb | .65 | .69 | .74 | .69 | .65 | .73 | .69 | .74 | .66 | .73 | .044 |
| F/G[d] | 1.76 | 1.82 | 1.57 | 1.68 | 1.81 | 1.73 | 1.68 | 1.54 | 1.57 | 1.59 | .121 |
| Day 7 to 14 | | | | | | | | | | | |
| ADG, lb | 1.03 | 1.02 | 1.03 | 1.09 | 1.15 | 1.13 | 1.09 | 1.03 | 1.07 | 1.04 | .051 |
| ADFI, lb | 1.26 | 1.34 | 1.32 | 1.39 | 1.40 | 1.36 | 1.35 | 1.34 | 1.29 | 1.31 | .053 |
| F/G | 1.22 | 1.31 | 1.28 | 1.28 | 1.22 | 1.20 | 1.24 | 1.30 | 1.21 | 1.26 | .055 |
| Day 0 to 14 | | | | | | | | | | | |
| ADG, lb | .70 | .70 | .75 | .75 | .76 | .77 | .75 | .76 | .75 | .75 | .038 |
| ADFI, lb | .96 | 1.01 | 1.02 | 1.04 | 1.02 | 1.05 | 1.02 | 1.04 | .97 | 1.02 | .043 |
| F/G[d] | 1.37 | 1.44 | 1.36 | 1.39 | 1.34 | 1.36 | 1.36 | 1.37 | 1.29 | 1.36 | .052 |

[a]A total of 300 pigs (five pigs per pen and 6 pens per treatment) with an average initial BW of 23.7 lbs.
[b]No effect of control diet vs added blood meal diets (P > .10).
[c]No effect of gamma ray and electron beam dosage (P > .10).
[d]Nonirradiated vs irradiated blood meal (P < .10).

Example 3

This Example shows the enhanced effects of ingredient and whole diet irradiation on nursery pig (young pig) performance.

Summary

Four hundred weaning pigs (initially 10.8 lbs and 14±2 d of age) were used in a 14-d growth assay to determine the effects of irradiation of individual ingredients or whole diet on growth performance. The inclusion of irradiated ingredients (corn, soybean meal, whey, animal plasma, fishmeal, and soybean oil) improved ADG and F/G from d 0 to 7 and for the overall trial (d 0 to 14), while irradiation of microingredients (macro and micro minerals, vitamins, synthetic amino acids and antibiotic) had no effect on growth performance. In addition, irradiation of all ingredients prior to mixing increased ADG and ADFI (P<0.05), while irradiation of diet after mixing did not.

Procedures

A total of 400 pigs (BW of 10.8 lb and 14±2 d of age) were used in a 14-d growth assay to determine the effects of irradiation of individual ingredients or whole diet on growth performance in nursery pigs. Pigs were blocked by weight and allotted to one of ten dietary treatments. There were eight pigs/pen and six pens/treatment. Pigs were housed in an environmentally controlled nursery in 5×5 ft pens on a commercial farm in N.E. Kansas. All pens contained one self-feeder and two nipple waters to provide ad libitum access to feed and water.

All diets were fed in pelleted form, and pigs were assigned to one of ten dietary treatments. First, a control diet was used containing ingredients that were not irradiated. Other treatments included diets that had specific ingredients irradiated, which included corn, soybean meal, whey, animal plasma, fishmeal, soybean oil, all microingredients combined (antibiotic, salt, monocalcium phosphate, limestone, zinc oxide, vitamin and trace mineral premixes, and DL-methionine). Finally, a diet including all ingredients that had been irradiated, and a diet that was manufactured and subsequently irradiated were utilized. All irradiated ingredients and complete feed were treated with gamma ray (colbalt-60 source) at an average dose of 8.5 kGy. All irradiated ingredients were processed at SteriGenics International, Schaumburg, Ill. The diet used in this experiment was formulated to contain 1.50% lysine, 0.90 Ca, and 0.50 available P. Average daily gain, ADFI, and F/G were determined by weighing pigs and measuring feed disappearance on d 7 and 14. Data was analyzed using the GLM procedure of SAS as a randomized complete block design with pen as the experimental unit.

Results

Irradiation of individual feed ingredients, as well as the complete diet proved to be successful in reducing bacteria concentrations (Table 2 of the Example). Bacteria levels in regular plasma and corn were noticeably the highest, with minimal concentrations detected in spray-dried whey and soybean oil. In addition, reductions in bacteria were found in the manufactured diets that had ingredients irradiated or if the entire diet had undergone irradiation treatment (Table 3 of the Example).

From d 0 to 7, the ADG of nursery pigs was improved (P<0.05) when pigs were fed either corn, soybean meal, whey, and plasma that had been irradiated (Table 4 of the Example). However, no improvements were detect with the irradiation of fishmeal, soybean oil, or microingredients, as well as if all ingredients or the complete feed was irradiated compared to the control diet. In addition, F/G was improved for diets containing irradiated complete diet, corn, soybean meal, whey, plasma, fishmeal, and soybean oil. However, no improvement in efficiency of gain was shown for pigs consuming diets that had the microingredients and all ingredients irradiated.

From d 7 to 14, ADG was improved (P<0.05) for diets containing irradiated plasma, soybean oil, and microingredients compared to the control. In addition, ADFI was increased for pigs consuming diets containing irradiated corn, plasma, and if all ingredients were irradiated. Irradiation did not effect efficiency of gain during this phase of the experiment.

Overall, ADG was increased (P<0.05) for all diets except when the microingredients and complete feed was irradiated. Furthermore, ADFI was improved (P<0.05) with pigs consuming feed that had the corn, plasma, and all ingredients irradiated. Finally, feed efficiency was improved (P<0.05) for pigs fed diets containing irradiated complete diet, corn, soybean meal, whey, plasma, fishmeal, and soybean oil. However, no improvement in efficiency of gain was shown for pigs consuming diets that had the microingredients and all ingredients irradiated.

In conclusion, the bacteria concentration of ingredients commonly used in nursery pig diets was reduced when subjected to irradiation treatment. In addition, the bacteria content of ingredient varies from high levels (plasma and corn) to very low levels (spray-dried whey and soybean oil) in bacteria level. Furthermore, use of irradiation on individual ingredients improved performance in most cases, regardless of bacteria concentration.

| 1. Composition of Diet (As Fed Basis) | |
|---|---|
| Ingredient | % |
| Corn | 38.98 |
| Soybean meal (46.5%) | 15.72 |
| Spray-dried whey | 25.00 |
| Spray-dried animal plasma | 6.00 |
| Select menhaden fish meal | 6.00 |
| Soybean oil | 5.00 |
| Medication[a] | 1.00 |
| Monocalcium phosphate (21% P) | .57 |
|  | .60 |
| Limestone | .39 |
| Zinc oxide | .25 |
| Vitamin premix | .25 |
| Salt | .15 |
| Trace mineral premix | .09 |
| DL-Methionine |  |
| Total | 100.00 |
| Calculated Analysis | |
| Lysine, % | 1.50 |
| Met:lysine ratio, % | 30 |
| Met & Cys:lysine ratio, % | 60 |
| Threonine:lysine ratio, % | 68 |
| Tryptophan:lysine ratio, % | 19 |
| ME, kcal/lb | 1,595 |
| Protein, % | 22.1 |
| Calcium, % | .90 |
| Phosphorus, % | .80 |
| Available phosphorus, % | .50 |

[a]Provided 50 g per ton carbadox.

TABLE 2

Bacteria Concentration of Feed Ingredients[a]

| | Total Plate Count | | Total Coliform Count | |
|---|---|---|---|---|
| Ingredient | Regular | Irradiated[a] | Regular | Irradiated[a] |
| Corn | $1.0 \times 10^5$ | $1.3 \times 10^2$ | $5.6 \times 10^4$ | $1.0 \times 10^1$ |
| Soybean meal (46.5%) | $1.5 \times 10^4$ | $1.7 \times 10^2$ | $7.1 \times 10^2$ | 0 |
| Spray-dried whey | $2.3 \times 10^2$ | $1.5 \times 10^2$ | 0 | 0 |
| Spray-dried animal plasma | $2.5 \times 10^5$ | $1.9 \times 10^2$ | 0 | 0 |
| Select menhaden fish meal | $7.6 \times 10^3$ | $4.0 \times 10^1$ | 0 | 0 |
| Soybean oil | $1.5 \times 10^2$ | $1.2 \times 10^1$ | 0 | 0 |
| Micronutrients[b] | $3.2 \times 10^3$ | $1.4 \times 10^2$ | $2.1 \times 10^2$ | 0 |

[a]Irradiated at an average dose of 8.5 kGy.
[b]Medication, monocalcium phosphate (21% P), limestone, zinc oxide, vitamin and trace mineral premixes, salt, and DL-Methionine.

TABLE 3

Bacteria Concentrations of Manufactured Diets[a]

Portion of diet treated with irradiatin prior to manufacturing

| Item | Control | Corn | SB Meal | Whey | Plasma | Fishmeal | SB Oil | Micro's[b] | All | Complete[c] |
|---|---|---|---|---|---|---|---|---|---|---|
| Total Plate Count | $3.2 \times 10^4$ | $8.4 \times 10^3$ | $9.0 \times 10^3$ | $5.6 \times 10^3$ | $9.2 \times 10^2$ | $2.0 \times 10^3$ | $4.2 \times 10^3$ | $1.2 \times 10^3$ | $8.5 \times 10^2$ | $8.5 \times 10^2$ |
| Total Coliform Count | $3.0 \times 10^3$ | $8.0 \times 10^2$ | $3.0 \times 10^3$ | $3.0 \times 10^3$ | $1.0 \times 10^1$ | 0 | $1.7 \times 10^2$ | $2.0 \times 10^1$ | 0 | 0 |

TABLE 4

Effects of Irradiation of Ingredients and Whole Diet on Nursery Pig Performance[a]

Portion of diet treated with irradiation prior to manufacturing

| Item | Control | Corn | SB Meal | Whey | Plasma | Fishmeal | SB Oil | Micro's[b] | All | Complete[c] | SE |
|---|---|---|---|---|---|---|---|---|---|---|---|
| Day 0 to 7 | | | | | | | | | | | |
| ADG, lb | .35[d,e] | .49[i] | .45[g,h,i] | .44[f,g,h,i] | .46[g,h,i] | .42[e,f,g] | .42[e,f,g,h] | .35[d] | .40[d,e,f,g] | .37[d,e,f] | .026 |
| ADFI, lb | .45[d,e,f] | .55[g] | .50[e,f,g] | .50[e,f,g] | .52[f,g] | .49[e,f,g] | .47[d,e,f,g] | .43[d,e] | .50[e,f,g] | .40[d] | .028 |
| F/G | 1.30[d] | 1.13[g] | 1.17[g] | 1.14[g] | 1.15[e,f,g] | 1.17[e,f,g] | 1.14[g] | 1.24[d,e,f] | 1.25[d,e] | 1.10[g] | .035 |
| Day 7 to 14 | | | | | | | | | | | |
| ADG, lb | .50[d] | .59[d,e] | .59[d,e] | .57[d,e] | .62[e] | .58[d,e] | .60[e] | .59[e] | .57[d,e] | .54[d,e] | .031 |
| ADFI, lb | .78[d] | .89[e,f] | .84[d,e,f] | .84[d,e,f] | .88[e,f] | .82[d,e,f] | .85[d,e,f] | .87[d,e,f] | .90[f] | .80[d,e] | .034 |
| F/G | 1.56[d,e] | 1.54[d,e] | 1.43[d,e] | 1.49[d,e] | 1.43[d,e] | 1.43[d,e] | 1.43[d,e] | 1.46[d,e] | 1.59[d] | 1.49[d,e] | .060 |
| Day 0 to 14 | | | | | | | | | | | |
| ADG, lb | .43[d] | .54[g] | .52[f,g] | .50[e,f,g] | .54[g] | .50[e,f,g] | .51[f,g] | .47[d,e,f] | .48[e,f] | .46[d,e] | .018 |

TABLE 4-continued

Effects of Irradiation of Ingredients and Whole Diet on Nursery Pig Performance[a]

| | | | | Portion of diet treated with irradiation prior to manufacturing | | | | | | | |
|---|---|---|---|---|---|---|---|---|---|---|---|
| Item | Control | Corn | SB Meal | Whey | Plasma | Fishmeal | SB Oil | Micro's[b] | All | Complete[c] | SE |
| ADFI, lb | .61[d] | .72[f] | .67[d,e,f] | .67[d,e,f] | .70[e,f] | .66[d,e,f] | .66[d,e,f] | .65[d,e] | .70[e,f] | .60[d] | .025 |
| F/G | 1.43[d] | 1.34[e] | 1.29[c] | 1.33[e] | 1.31[e] | 1.32[e] | 1.30[e] | 1.37[d,e] | 1.44[d] | 1.32[e] | .031 |

[a]A total of 400 pigs (8 pigs per pen and five pens per treatment) with an average initial BW of 10.8 lb.
[b]Antibiotic, salt, monocalcium phosphate, limestone, zinc oxide, vitamin and trace mineral premixes, and DL-methionine.
[c]Complete diet manufactured then irradiated.
[d,e,f,g,h,i]Means in same row with superscripts differ ($P < .05$).

TABLE 1

Growth Performance of Nursery Pigs Fed Various Specialty Protein Products (Regular or Irradiated)[a]

| | No Plasma | AP 920 | | ProtiOne | | DPS 30 | | Peptide Plus | | Spray-dried Egg | | |
|---|---|---|---|---|---|---|---|---|---|---|---|---|
| Item | Control | Regular | Irradiated | Regular | Irradiated | Regular | Irradiated | Regular | Irradiated | Regular | Irradiated | SE |
| D 0 to 7 | | | | | | | | | | | | |
| ADG[bcdg] | .43 | .52 | .60 | .59 | .59 | .53 | .52 | .43 | .50 | .49 | .46 | .028 |
| ADFI[c] | .43 | .49 | .55 | .50 | .50 | .43 | .45 | .38 | .40 | .42 | .38 | .024 |
| F/G[cdef] | 1.01 | .94 | .92 | .85 | .85 | .81 | .86 | .88 | .80 | .86 | .83 | .037 |

[a]Total of 330 nursery pigs (Initially 13.40 BW and 20 d of age).
[b]Control vs Regular AP 920 ($P < .05$).
[c]Control vs Regular ProtiOne ($P < .05$).
[d]Control vs Regular DPS 30 ($P < .05$).
[e]Control vs Regular Peptide Plus ($P < .05$).
[f]Control vs Regular Spray-dried Egg ($P < .05$).
[g]Regular vs Irradiated AP 920 ($P < .05$).

TABLE 2

Bacteria Concentration of Various Specialty Protein Products (Regular or Irradiated)

| | No Plasma | AP 920 | | ProtiOne | | DPS 30 | | Peptide Plus | | Spray-dried Egg | |
|---|---|---|---|---|---|---|---|---|---|---|---|
| Item | Control | Regular | Irradiated | Regular | Irradiated | Regular | Irradiated | Regular | Irradiated | Regular | Irradiated |
| Bacteria Product Diet | N/A | $8.7 \times 10^4$ | $7.0 \times 10^1$ | $6.9 \times 10^3$ | $3.0 \times 10^1$ | $1.0 \times 10^3$ | $3.0 \times 10^1$ | $2.6 \times 10^2$ | $2.0 \times 10^1$ | $4.7 \times 10^3$ | $1.0 \times 10^1$ |

Example 4

Effects of Irradiation Processing of Speciality Protein Products of Nursery Pig Performance Summary Three hundred weaning pigs (initially 13.4 lb and 20±2 d of age) were used in a 1 4-d growth assay to determine the effects of irradiation processing of specialty protein products on nursery pig performance. Overall, irradiated of AP 920 and Peptide-Plus™ resulted in increased ADG compared to pigs fed nonirradiated products. Irradiation of Peptide-Plus™ improved feed efficiency compared to its nonirradiated form. Also, ADG was greater when pigs were fed diets containing ProtiOne™ and DPS 30, and tended to increase with AP 920 compared to those fed the control diet. In addition, feed efficiency was improved when pigs were fed diets containing ProtiOne™, DPS 30, Peptide-Plus™, and spray-dried egg compared to the control diet. Therefore, adding specialty protein products to diet in most cases improved growth performance, while irradiation processing improved growth performance of certain specialty protein products.

Introduction

Currently, a variety of dried blood and egg co-products are commercially available for use in diets for early weaned pigs. Recent research conducted at Kansas State University has shown improvements in growth performance of nursery pigs fed diets that had irradiated spray-dried animal plasma or spray-dried blood meal compared to nonirradiated forms. Although the mechanism for improved growth performance is unclear, we believe that this may be an increase in digestibility of these irradiated co-products. This increase in digestibility may involve a breakdown of antinutritional factors associated with the ingredients or structural changes in the protein complex that make the protein more available to the young pig. In addition, a reduction in the bacteria concentration within the product occurs, which may increase pig performance as well. Therefore, it was our objective to compare the effects of irradiation of several different commercially available specialty protein products on nursery pig performance.

Procedures

A total of 330 pigs (initially 13.4 lb and 20±2 d of age) were used in a 14-d growth assay. Pigs were blocked by weight and allotted to one of eleven dietary treatments. There were five pigs/pen and six pens/treatment. Pigs were housed in the Kansas State University Segregated Early Wean Facility. Each pen was 4×4 ft and contained one self-feeder and one nipple water to provide ad libitum access to feed and water.

All diets were fed in pelleted form (Table 1 of this Example 4). The diets were formulated to contain 1.50% lysine, 0.90% Ca, 0.80% P, 0.46% Na, and 0.57% Cl. In addition, 2.50% fishmeal and 0.15% crystalline lysine was added to all diets, with other crystalline amino acids (methionine, threonine, isoleucine, and tryptophan) included (if necessary) to maintain similar ratios of amino acids related to lysine. Experimental treatments included a control diet or the control diet with either 5% spray-dried animal plasma (American Protein Corporation, AP 920); animal plasma, dried egg product, animal serum, serum albumin, and serum globulin combination (DuCoa L.P., ProtiOne™); dried porcine digest (Nutra-Flo Protein Products, DPS 30); liquefied and spray-dried beef muscle (Esteem Products Inc, Peptide Plus™); and spray-dried whole egg (California Spray Dry Company). All specialty protein products were either fed irradiated or as-is, and originated from the same lot for each source. Irradiated protein sources were processed with gamma ray (cobalt-60 source) irradiation at an average dose of 8.5 kGy. Because all added specialty protein products were included at 5% of the total diet, soybean meal was allowed to vary depending on the nutrient profile of the specialty protein product. Since all specialty protein products were included in the diet at a fixed amount, and not on a nutrient profile basis, direct comparisons between specialty protein products were not made, nor was it an objective of this experiment. Average daily gain, ADFI, and F/G were determined by weighing pigs and measuring feed disappearance on d 7 and 14. Samples of the specialty protein products were obtained prior to feed manufacturing of the complete feed for bacteria analysis.

Data was analyzed as a randomized complete block design with pen as the experimental unit, Pigs were blocked based on weaning weight, and analysis of variance was performed using the GLM procedure of SAS.

Results and Discussion

For d 0 to 7 (Table 2 of this Example 4), irradiation of AP 920 ($P<0.05$) and Peptide-Plus™ ($P<0.10$) resulted in greater ADG versus pigs fed diets containing their nonirradiated form. Irradiation of Peptide-Plus™ improved feed efficiency numerically ($P<0.10$) compared to those fed nonirradiated Peptide-Plus™. In addition, nonirradiated AP 920, ProtiOne™, and DPS 30 had increased ADG ($F<0.05$) while nonirradiated spray-dried egg tended to improve ($P<0.10$) ADG compared to the control diet. Also, ADFI was increased ($P<0.05$) when ProtiOne™, and tended to increase ($F<0.10$) with AP 920 and Peptide-Plus™ compared to the control diet. Furthermore, feed efficiency was improved ($P<0.05$) for pigs fed diet diets containing nonirradiated ProtiOne™, DPS 30, and spray-dried egg, while AP 920 and Peptide-Plus™ tended to improve ($P<0.10$) F/G compared to the control diet.

Overall, irradiated AP 920 and Peptide-Plus™ resulted in increased ($P<0.05$) ADG compared to pigs fed the nonirradiated form of these products. Irradiation of Peptide-Plus™ improved ($P<0.05$) feed efficiency compared to its nonirradiated form. Also, ADG was greater ($P<0.05$) when pigs were fed diets containing ProtiOne™ and DPS 30, and tended ($P<0.10$) to increase with AP 920 compared to those fed the control diet. In addition, feed efficiency was improved ($P<0.05$) when pigs were fed diets containing ProtiOne™, DPS 30, Peptide-Plus™, and spray-dried egg compared to the control diet.

Bacteria concentrations of the specialty protein products varied widely, with AP 920 having the highest concentration and Peptide-Plus™ the lowest (Table 3). Irradiation processing did prove to be an effective technique to reduce the bacteria level in each of the products. However, no consistent response to improvements in growth performance was observed to the reduction of bacteria within each source. This is evidenced by for AP 920 and Peptide-Plus™, which had the highest and the lowest bacteria concentrations, yet were the only two products that elicited responses to irradiation processing. This suggests that improvements in growth performance are not based on a decrease in bacteria, but rather an increase in digestibility or decrease in an antinutritional factors associated within with that product.

Therefore, adding specialty protein products to diets improved growth performance in most cases, while irradiation processing improved growth performance on a more limited basis in these commercial products. The lack of response to irradiation in some ingredients can possibly be explained by the different manufacturing techniques and/or nutrient profile of each of these products. In addition alterations of inclusion levels for each specialty protein product may influence the response due to irradiation treatment.

TABLE 1

Composition of Experimental Diets (As-Fed Basis)

| Ingredient, % | Control | AP 920 | ProtiOne ™ | DPS 30 | Peptide-Plus ™ | Spray dried egg |
|---|---|---|---|---|---|---|
| Corn | 34.87 | 42.36 | 42.24 | 33.68 | 39.76 | 35.15 |
| Soybean meal, 46.5% | 32.81 | 20.84 | 20.75 | 29.52 | 23.78 | 27.66 |
| Spray-dried whey | 20.00 | 20.00 | 20.00 | 20.00 | 20.00 | 20.00 |
| AP 920 | — | 5.00 | — | — | — | — |
| ProtiOne ™ | — | — | 5.00 | — | — | — |
| DPS 30 | — | — | — | 5.00 | — | — |
| Peptide-Plus ™ | — | — | — | — | 5.00 | — |
| Spray-dried egg | — | — | — | — | — | 5.00 |
| Soybean oil | 5.00 | 5.00 | 5.00 | 5.00 | 5.00 | 5.00 |
| Fish meal | 2.50 | 2.50 | 2.50 | 2.50 | 2.50 | 2.50 |
| Monocalcium P, 21% | 1.21 | 1.10 | 1.24 | 1.22 | .47 | 1.22 |
| Limestone | .75 | .89 | .77 | .62 | .86 | .77 |
| Antibiotic[1] | 1.00 | 1.00 | 1.00 | 1.00 | 1.00 | 1.00 |
| Salt | .37 | .25 | .31 | .19 | .07 | .38 |
| Zinc oxide | .39 | .39 | .39 | .39 | .39 | .39 |
| Vitamin premix | .25 | .25 | .25 | .25 | .25 | .25 |
| Trace mineral premix | .15 | .15 | .15 | .15 | .15 | .15 |

TABLE 1-continued

Composition of Experimental Diets (As-Fed Basis)

| Ingredient, % | Control | AP 920 | ProtiOne ™ | DSP 30 | Peptide-Plus ™ | Spray dried egg |
|---|---|---|---|---|---|---|
| Sodium bicarbonate | .38 | — | — | — | — | .28 |
| Calcium Chloride | — | — | .08 | .18 | .38 | — |
| L-Lysine HCl | .15 | .15 | .15 | .15 | .15 | .15 |
| DL-Methionine | .13 | .10 | .15 | .10 | .14 | .07 |
| L-Threonine | .04 | .01 | .02 | .04 | .08 | .03 |
| L-Tryptophan | — | .01 | — | .01 | .02 | — |
| Total | 100.00 | 100.00 | 100.00 | 100.00 | 100.00 | 100.00 |
| Calculated Analysis | | | | | | |
| Lysine, % | 1.50 | 1.50 | 1.50 | 1.50 | 1.50 | 1.50 |
| Met:lysine ratio, | 32 | 28 | 28 | 31 | 35 | 31 |
| Met & Cys-lysine ratio, % | 57 | 57 | 57 | 57 | 57 | 57 |
| Threonine-lysine ratio, % | 64 | 64 | 64 | 64 | 64 | 64 |
| Isoleucine:lysine ratio, % | 66 | 61 | 62 | 65 | 64 | 69 |
| Tryptophan:lysine Ratio, % | 19 | 19 | 19 | 19 | 19 | 19 |
| Sodium, % | .46 | .46 | .46 | .46 | .46 | .46 |
| Chloride, % | .58 | .58 | .58 | .58 | .58 | .58 |
| ME, kcal/lb | 1564 | 1585 | 1585 | 1578 | 1573 | 1625 |
| DEB | 353 | 287 | 287 | 352 | 308 | 332 |

[1]Provided 50 g per ton carbadox.

TABLE 2

Growth Performance of Nursery Pigs Fed Various Specialty Protein Products (Regular or Irradiated)[2]

| | | AP 920 | | ProtiOne ™ | | DPS 30 | | Peptide-Pluis ™ | | Spray-dried Egg | | |
|---|---|---|---|---|---|---|---|---|---|---|---|---|
| Item | Control | Regular | Irradiated | Regular | Irradiated | Regular | Irradiated | Regular | Irradiated | Regular | Irradiated | SEM |
| D0 to 7 | | | | | | | | | | | | |
| ADG, lb | .43 | .52[b] | .60[d] | .59[b] | .59 | .53[b] | .52 | .43 | .50[c] | .49[c] | .46 | .03 |
| ADFI, lb | .43 | .49[c] | .55 | .59[b] | .50 | .43 | .45 | .38[c] | .40 | .42 | .38 | .02 |
| F/G | 1.01 | .94[c] | .92 | .85[b] | .85 | .81[b] | .86 | .88[c] | .80[c] | .86[b] | .83 | .04 |
| D7 to 14 | | | | | | | | | | | | |
| ADG, lb. | .58 | .59 | .62 | .68[b] | .63 | .71[b] | .69 | .59 | .64 | .61 | .62 | .03 |
| ADFI, lb. | .71 | .72 | .76 | .73 | .70 | .75 | .75 | .66 | .67 | .70 | .68 | .03 |
| F/G | 1.22 | 1.22 | 1.23 | 1.07[b] | 1.11 | 1.06[b] | 1.09 | 1.11 | 1.05 | 1.15 | 1.10 | .03 |
| D0 to 4 | | | | | | | | | | | | |
| ADG, lb | .50 | .56[c] | .61[c] | .63[b] | .61 | .62[b] | .60 | .51 | .57[c] | .55 | .54 | .02 |
| ADFI, lb | .57 | .61 | .65 | .62 | .62 | .59 | .60 | .52 | .53 | .56 | .53 | .02 |
| F/G | 1.14 | 1.09 | 1.07 | .98[b] | 1.02 | .95[b] | 1.00 | 1.02[b] | .93[d] | 1.02[b] | .98 | .03 |

A total of 330 pigs (five Pigs Per pen and six pens per treatment) with an initial BW of 13A lb. Specialty protein products include: spray-dried animal plasma (American Protein Corporation, AP 920); animal plasma, dried egg product, animal serum, serum albumin, and serum globulin combination (DuCoa LP., ProtiOne ™); dried porcine digest (Nutra-Flo, Protein Products, DPS 30), liquefied and spray-dried beef muscle (Esteem Products Inc., Peptide Plus ™); and spray-dried whole egg (California Spray Dry Company).
[bc]Control diet versus nonirradiated (regular) specialty protein source, $P < .05$ and $P < .10$, respectively.
[dc]Irradiated versus (regular) specialty protein source, $P < .05$ and $P < .10$, respectively.

TABLE 3

Bacteria Concentration of Various Specialty Protein Products (Regular or Irradiated)

| | | AP 920 | | ProtiOne ™ | | DPS 30 | | Peptide-Pluis ™ | | Spray-dried Egg | | |
|---|---|---|---|---|---|---|---|---|---|---|---|---|
| Item | Control | Regular | Irradiated | Regular | Irradiated | Regular | Irradiated | Regular | Irradiated | Regular | Irradiated | SEM |
| Total Plate Count | N/A | $8.7 \times 10^4$ | $7.0 \times 10^1$ | $6.9 \times 10^3$ | $3.0 \times 10^1$ | $1.0 \times 10^3$ | $3.0 \times 10^1$ | $2..6 \times 10^2$ | $2.0 \times 10^1$ | $4.7 \times 10^3$ | $1.0 \times 10^1$ | |

[2]Samples obtained prior to manufacturing of complete diet.

The present invention has been described in what is considered to represent its preferred embodiments. However, it should be noted that the invention may be practiced otherwise than as specifically illustrated and described without departing from the spirit and the scope of the invention.

Although this invention has been described in terms of specific embodiments which are set forth in considerable detail herein, it should be understood that this description is by way of illustration only and that the invention is not necessarily limited thereto, since alternative embodiments and operating techniques will become apparent to those skilled in the art in view of the disclosure herein. Accordingly, modifications are contemplated which can be made without departing from the spirit and scope of the described invention.

What is claimed is:

1. A method for preparing a nutritionally adequate diet for an animal, said diet having a reduced pathogen content and said diet providing therewith an effective amount of at least one irradiated dried blood component, which comprises subjecting a non or partially irradiated component to at least one of ionizing radiation and gamma radiation and applying an effective amount of said one of ionizing radiation and gamma radiation to said component whereby said irradiated dried blood component is produced.

2. The method of claim 1 wherein said animal comprises a young pig.

3. The method of claim 2 wherein said dried blood component is selected from animal plasma, blood cells and blood meal.

4. The method of claim 1, wherein said irradiated dried blood component is selected from whole blood meal, blood plasma and blood cells.

5. The method of claim 4 wherein said component is blood plasma or animal plasma and said animal is a pig weighing from about 4 pounds to about 50 pounds.

6. A nutritionally balanced pig feed, wherein said feed comprises an effective amount of at least one irradiated dried blood component.

7. The feed of claim 6 wherein said irradiated dried blood component is selected from animal plasma, blood cells and blood meal.

8. The feed of claims 6, wherein said irradiated dried blood component is selected from whole blood meal, blood plasma, blood cells, and hydrolyzed blood products.

9. A nutritionally adequate diet for a young pig which comprises a dried blood irradiated component.

10. A method in accordance with claim 2 wherein said young pig weighs from about 4 pounds to about 50 pounds.

11. A method in accordance with claim 10 wherein said dried blood component is selected from dried blood cells, dried blood plasma and dried blood meal.

12. A method in accordance with claim 10 wherein said irradiated component is irradiated with an effective amount of gamma irradiation.

13. A method in accordance with claim 10 wherein said irradiated component is irradiated with an effective amount of electron beam radiation.

14. A method in accordance with claim 10 wherein said irradiation means comprises X-ray radiation.

15. A method in accordance with claim 10 wherein said young pig weighs from about 4 to about 50 pounds.

16. The method of claim 12 wherein said dried blood component is irradiated at a rate from about 0.1 to about 300 kGy per pound of said irradiated component.

17. The method of claim 16 wherein said rate is from about 0.1 to about 50 kGy per pound said irradiated component.

18. The feed of claim 6 wherein said pig weighs from about 4 to about 50 pounds.

19. The feed of claim 18 wherein said dried blood component is selected from dried blood cells, dried blood plasma and dried blood meal.

20. A diet in accordance with claim 9 wherein said dried blood irradiated component is selected from dried blood cells, dried blood plasma and dried blood meal.

21. A diet in accordance with claim 20 wherein said young pig comprises a pig weighing from about 4 pounds to about 30 pounds.

* * * * *